United States Patent [19]
Abbatiello et al.

[11] 3,834,256
[45] Sept. 10, 1974

[54] ULTRASONICALLY CONTROLLED THICKNESS MACHINING

[75] Inventors: Leonard A. Abbatiello, Oak Ridge, Va.; Loren E. Carey, Lenoir City, Va.; Donald V. Ferree, Lynchburg, Va.; Walter L. Green, Knoxville, Tenn.

[73] Assignee: The United States of America as represented by the Atomic Energy Commission, Washington, D.C.

[22] Filed: Aug. 15, 1973

[21] Appl. No.: 388,515

[52] U.S. Cl..................... 82/21 A, 82/2 B, 82/21 B
[51] Int. Cl............................................. B23b 25/06
[58] Field of Search ................. 82/2 B, 21 A, 21 B; 90/11 R

[56] References Cited
UNITED STATES PATENTS

| | | | |
|---|---|---|---|
| 2,927,258 | 3/1960 | Lippel | 82/2 B |
| 3,483,795 | 12/1969 | Wranosky | 90/11 R |
| 3,623,216 | 11/1971 | Aihara et al. | 82/2 B |

*Primary Examiner*—Leonidas Vlachos
*Attorney, Agent, or Firm*—John A. Horan; David S. Zachry; Louis M. Deckelmann

[57] ABSTRACT

An ultrasonically controlled machining system is provided wherein the inside contour of the part is used as a datum surface from which the outside contour is machined to obtain a desired wall thickness. An ultrasonic probe is used to locate the datum surface and an electrohydraulic control system is used to properly position the tool a distance equal to the desired wall thickness. By using ultrasonic sound to control the distance, it is possible to apply this machining technique to most materials or combinations of materials. This concept eliminates the necessity of maintaining accurate part alignment to achieve accurate wall thickness control.

7 Claims, 3 Drawing Figures

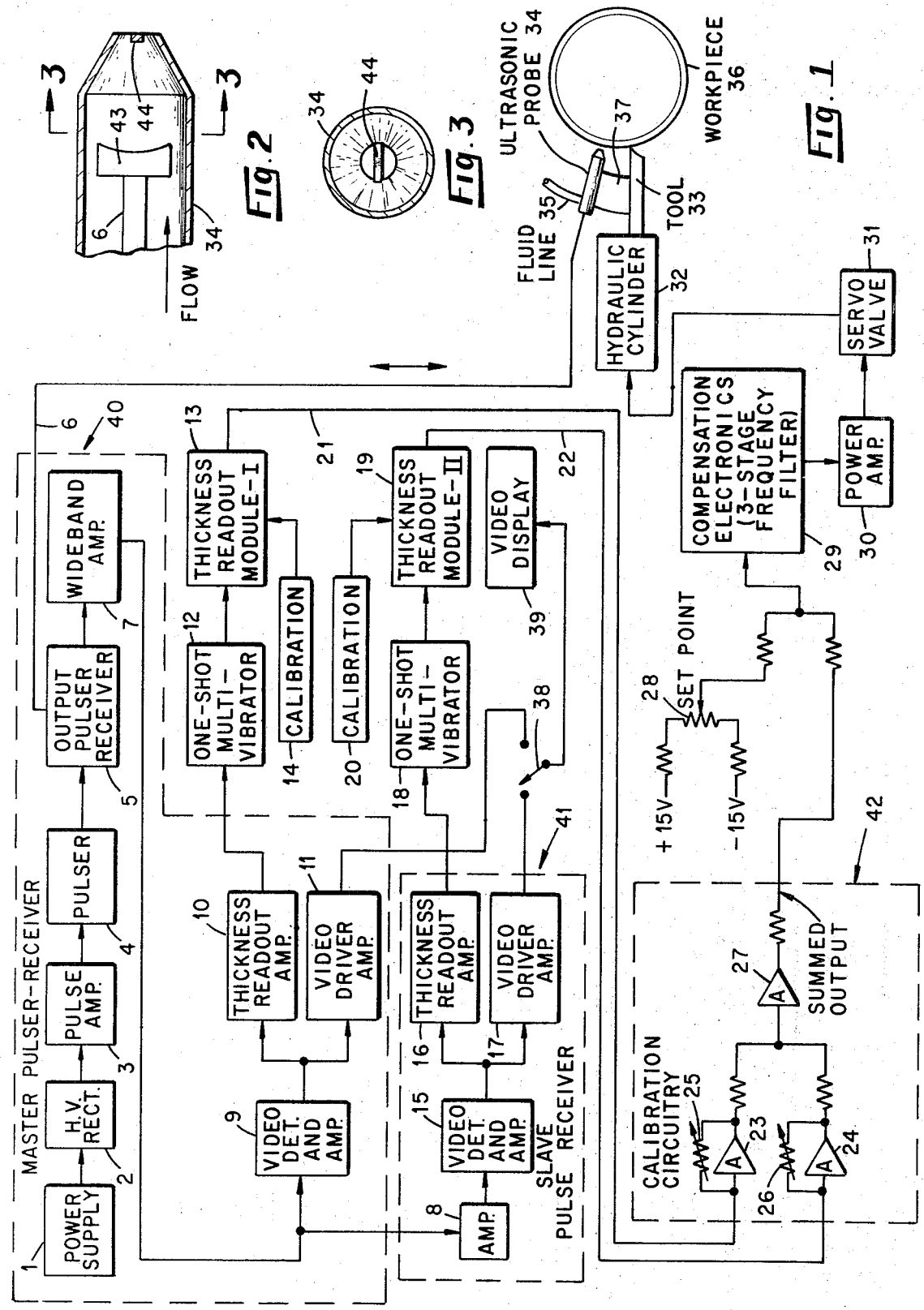

ULTRASONICALLY CONTROLLED THICKNESS MACHINING

BACKGROUND OF THE INVENTION

This invention was made in the course of, or under, a contract with the United States Atomic Energy Commission.

The conventional method of machining a controlled wall thickness part or workpiece is to cut the inner contour and then transfer the part to another fixture and cut the outer contour. Errors in the wall thickness are caused by the errors in machine path accuracy, part temperature variation between operations, and setup and fixturing errors for the final contour. Thus, there exists a need for a machining system which can eliminate the necessity of maintaining accurate part alignment to achieve accurate wall thickness control. The present invention was conceived to meet this need in a manner to be described hereinafter.

SUMMARY OF THE INVENTION

It is the object of the present invention to provide an improved system for achieving constant wall thickness machining.

The above object has been accomplished in the present invention by utilizing an ultrasonic probe in a feedback circuit wherein the probe is used to locate a datum surface of a part and an electrohydraulic control system is used to properly position the cutting tool of the system a distance equal to the desired wall thickness of said part to be machined. In the present invention, the inside contour of the part is used as the datum surface from which the outside contour is machined to obtain a desired wall thickness in a manner to be described, thus eliminating the necessity of maintaining accurate part alignment to achieve accurate wall thickness control.

BRIEF DESCRIPTION OF THE DRAWINGS

FIG. 1 is a block diagram of the ultrasonically controlled thickness machining system of the present invention;

FIG. 2 is a partial cross-sectional view of the ultrasonic probe of FIG. 1; and

FIG. 3 is a sectional view of the probe of FIG. 2 on the line 3—3 thereof.

DESCRIPTION OF THE PREFERRED EMBODIMENT

The ultrasonically controlled thickness machining system of the present invention is illustrated in FIG. 1 of the drawings to which reference is now made. A master pulser-receiver unit is designated generally by the reference numeral 40. In this unit, a power supply 1 is coupled by means of a high voltage rectifier 2, a pulse amplifier 3, and a pulser 4 to an output pulser-receiver 5. The output of the unit 5 is coupled by means of a coaxial cable 6 to an ultrasonic probe 34. Reflected pulses from a brass strip in the end of probe 34, from the front surface of a workpiece 36, and from the back surface of the workpiece 36 are fed back to the unit 5 and then fed to a wideband amplifier 7. The output of amplifier 7 is coupled to a first video detector and amplifier 9 and to a second video detector and amplifier 15 by way of an amplifier 8.

The output of the unit 9 is jointly coupled to a thickness readout amplifier 10 and to a video driver amplifier 11. The amplifier 10 is coupled to a thickness readout unit 13 by way of a one-shot multivibrator 12. A calibration unit 14 is also coupled to the unit 13. The output of the amplifier unit 15 is jointly coupled to a thickness readout amplifier 16 and to a video driver amplifier 17. The amplifier 16 is coupled to a second thickness readout unit 19 by way of second one-shot multivibrator unit 18. A calibration unit 20 is also coupled to the unit 19. The outputs of the video driver amplifier units 11 and 17 are selectively coupled to a video display unit 39 by means of a selector switch 38.

The master pulser-receiver unit 40 comprising the individual units 1–5, 7, and 9–11 is a unit made by Automation Industries, Inc., Sperry Products Division, Danbury, Connecticut, as their Model No. 50W. The slave pulse-receiver unit, designatd by the general reference numeral 41, and comprising the individual units 8, and 15–17, utilizes only a portion of another Model No. 50W unit made by the above company. For example, only the output stage amplifier 8 of an amplifier 7 is utilized in the slave unit in addition to the units 15, 16 and 17.

The output of the thickness readout unit 13 is coupled by means of a lead line 21 to an amplifier 23 provided with an adjustable gain 25 connected thereacross, and the output of the thickness readout unit 19 is coupled by means of a lead line 22 to an amplifier 24 provided with an adjustable gain 26 connected thereacross. The outputs of the amplifiers 23 and 24 are connected together as a combined input to an amplifier 27 to provide a summed output therefrom. The units 23–27 constitute a calibration circuitry which is designated by the general reference numeral 42.

A set point potentiometer 28 provides an output which is compared with the summed output from the amplifier 27 and the result is fed to a three-stage frequency filter unit 29 which is utilized to provide proper magnitude and phase characteristics of signals fed thereto.

It should be understood that the outputs of the amplifiers 23 and 24 may be selectively connected individually to a range meter, not shown, such that the respective gains thereof may be adjusted by the respective units 25 and 26, or these outputs may be combined and fed to an amplifier (not shown) whose output is then fed to said meter.

The output of the three-stage frequency filter 29 is connected to a servo valve unit 31 by way of a power amplifier 30. The servo valve 31 controls a hydraulic cylinder unit 32 which, in turn, is utilized for the proper positioning of a cutting tool 33 with respect to the workpiece 36. The ultrasonic probe 34 is mechanically affixed to the holder for the tool 33 by means of a bracket 37 such that the front face of the probe 34 is spaced about 0.10 inch from the outer surface of the workpiece 36 while the tip of the cutting tool 33 is contacting that outer workpiece surface.

The probe 34 is illustrated in more detail in FIGS. 2 and 3 of the drawings. An ultrasonic sensor 43 is affixed within a Plexiglas tube and coupled to the coaxial cable 6. The ultrasonic sound from the sensor 43 is coupled through a flowing liquid medium (usually water or a cutting oil) to the part being machined. The liquid medium is fed to the probe 34 by means of a feed line 35 (FIG. 1) from a source of fluid, not shown. For a sensor having a focal length of 2.5 inches the sensor 43 is positioned approximately 1.5 inches from the front surface of the part being machined for optimum energy reflection from the part surfaces.

In order to increase or improve the sensitivity of the feedback system for the positioning of the cutting tool, a brass target strip 44 is placed in the end of the Plexiglas tube 34, as more clearly seen in FIG. 3, to create an ultrasonic reflected reference pulse close in position to the ultrasonic reflected pulse from the front surface of the workpiece part 36. This reference target pulse technique produces two beneficial results. It increases the sensitivity of the readout system of FIG. 1 to the movement of the part. It also reduces the significant, apparent total change in distance that can be induced by a change in velocity of sound caused by fluctuations in temperature of the coupling fluid medium.

The sensor 43 may be an Aerotech, Alpha Series, ultrasonic transducer, operated at 15 M Hz frequency, for example. The servo valve or controller 31 may be a Model 82F304 unit made by Moog, Inc., Industrial Division, East Aurora, New York, for example. The thickness readout units 13 and 19 may each be a type UM, style 50E568 unit made by Automation Industries, Inc., Sperry Products Division, Danbury, Connecticut, for example. The video display 39 may be a Model UM721 unit by the above same company as the thickness readout units 13 and 19, for example.

In the operation of the system of FIG. 1, the output pulserreceiver unit 5 transmits electrical pulses over the cable 6 at a maximum rate of about 10,000 pulses per second to the ultrasonic sensor 43 which converts the pulses to ultrasonic energy. The energy travels through the fluid path to the brass strip 44 and to the rotating part 36. The wideband amplifier 7 receives the reflected energy from the brass strip 44 and the rotating part 36 and converts the reflected signals to amplified electrical pulses which, in turn, are routed to the two thickness readout units 13 and 19, as shown in FIG. 1.

The thickness readout modules 13 and 19 measure the time between two consecutive pulses and produce voltage levels proportional to the distance measured. Each of the readout units 13 and 19 is provided with an adjustable gate such that the unit 13 measures the distance from the sensor reference strip 44 to the front surface of the part 36, and the unit 19 measures the wall thickness of the part. The monostable, or one-shot, multivibrator units 12 and 18 were connected into the input circuits to the respective readout units 13 and 19 to prevent the units 13 and 19 from randomly measuring between wrong pulses. The unit 12 triggers on the leading edge of the initial reflected pulse from the reference strip 44, and the unit 18 triggers on the leading edge of the reflected pulse from the front surface of the part 36, such that the units 12 and 18 function to shape and widen the desired pulses and equalize the amplitudes, thus improving the reliability of the units 13 and 19 to measure between the correct pulses.

The respective calibration units 14 and 20 are coupled to the respective thickness readout units 13 and 19 for the following reasons. Each of the units 14 and 20 includes two one-shot multivibrator units which are utilized to adjust the time constants of the respective readout units 13 and 19 to insure the accurate measurements of the two thicknesses being measured, and to adjust the voltage slopes of the output signals of the respective units 13 and 19 to insure that these slopes are the same when fed to the calibration circuitry 42.

The output voltages of the two thickness readout modules 13 and 19 are summed in the circuitry 42 and the summed output therefrom is compared with a set point signal from the unit 28 and the resultant signal after being filtered by the unit 29 is utilized to provide an error signal to the servo valve unit 31 which controls the reference strip 44 of the probe 34 a constant distance from the back surface of the part 36 being machined. The use of the unit 29 improves the dynamic and static characteristics of the servo system.

It should be noted that if only one thickness readout module had been used, the servo system could not control from the back surface of the part, but only from the front surface.

In connection with the sensitivity improvement mentioned hereinabove, the present system measures between the pulse created from the reference target 44 and a pulse from the front surface of the part 36, a distance of about 0.1 inch. This provides a maximum sensitivity in the system to changes in the distance of 1 volt/mil compared to about 60 millivolts/mil without the reference strip. Changes in the temperature of the coupling fluid of 1° F will cause an apparent change in the fluid path of about 130 microinches when the effective fluid path is about 0.1 inch due to the use of the reference target. Without the target, the effective fluid path is about 1.5 inches causing this apparent change to be 1,900 microinches. The brass strip 44 may be 0.005 inch thick and 3/16 inch wide, for example. It use makes the fluid path distance from the reference surface to the front surface of the part 36 of about the same magnitude as the wall thickness of the part 36, implying the system's sensitivity to changes in the two distances will be approximately equal.

During some high speed tests, fluid turbulence due to excess fluid on the part 36 often caused instability of operation. The excess fluid, adhering to and rotating with the part, interfered with the fluid column flowing out of the end of the probe 34. This problem was minimized by placing a squeegee on the part to wipe off the excess fluid along with an air hose aimed at the cylinder to blow off any excess fluid which the wiper might miss. Part speeds of up to 2,000 rpm have been successfully followed by the control system of the present invention without any malfunction.

Summarizing the operation of the above-described system, two distance measurements are made simultaneously by two thickness readout modules, and two output voltages, proportional to the measured distances, are calibrated by the calibration electronics which equalizes their gains ($\Delta$ volts/$\Delta$ mils). The voltages are then summed to equal a voltage proportional to the total distance from the reference strip in the probe end to the back surface of the part being machined. The summed voltage is sampled periodically and negatively summed with a command voltage which is proportional to the desired commanded distance. Any difference between the commanded voltage and the feedback voltage drives the hydraulic cylinder which moves the tool the correct distance so that the two voltages are equal and sum to zero voltage.

The above system can machine wall thickness down to 50 mils of aluminum and the upper wall thickness limit is unbounded.

The machining technique of the present invention, as described hereinabove, is considered to have the following advantages over the prior art.

1. The present system makes it possible to machine large parts of homogeneous materials to wall thickness tolerances never before possible using conventional machining techniques.
2. A basic unique feature of the present system is its ability to measure two different distances simultaneously and to calibrate and sum the voltages to provide a voltage proportional to the total measured distances.
3. The use of a reference target in the end of the ultrasonic probe to substantially equalize two different distances and to reduce error in the fluid path measurement caused by temperature variations in the coupling fluid medium, and the use of monostable multivibrators to improve the reliability of the electronic system have made it possible to use the system in a closed loop feedback system.
4. The coupling of the ultrasonic energy from the transducer to the part being machined through a small continuously flowing stream of coupling fluid is also a unique feature of the present invention.
5. The two readout channels of the present system can be calibrated which does not require operation of the actual cutting system. This can be accomplished by inputting properly timed reference pulses (the timing is a function of the ratio of velocity of sound in the coupling fluid and in the material being machined) and processing these pulses through the system, adjusting the system gains until analogue outputs from both channels are equal.

This invention has been described by way of illustration rather than by limitation, and it should be apparent that it is equally applicable in fields other than those described. For example, it can be used to position a welding beam the correct distance from a surface as two metal cylindrical parts are rotated and welded together. It can also be used for machining a shallow groove of constant depth. Also, the concept of the present invention can be extended to multilayer structures by using more thickness readout modules. In addition, the present invention is versatile in that it can use various cutting fluids as the liquid medium to conduct ultrasonic sound. Also all metal parts, magnetic or nonmagnetic, can be machined.

What is claimed is:

1. A machining device for controlled thickness machining of a rotating workpiece comprising a cutting tool positioned adjacent to the surface of said workpiece and adapted to be moved into engagement therewith to effect a cutting operation thereof, an ultrasonic transmitter and receiver probe, a hydraulic actuator for positioning said tool and said probe, both said tool and said probe affixed to said actuator, said probe including a housing provided with a fluid entrance port and a fluid exit port for directing controlled fluid flow through said housing, a thin metallic reference strip mounted in said housing exit port, an ultrasonic transmitter-receiver sensor positioned within said probe housing a given distance from the front surface of said workpiece, said exit port with said reference strip being in axial alignment with said sensor, a master pulser-receiver coupled to said probe sensor, said sensor adapted to direct ultrasonic pulses onto said reference strip and said workpiece and receive reflected pulses from said strip and from the front and back surfaces of said workpiece, a slave pulse-receiver, said slave pulse-receiver and said master pulser-receiver adapted to receive said reflected pulses from said probe sensor, a gated first thickness readout unit coupled to said master pulser-receiver for receiving said reflected signals and providing a first output voltage proportional to the distance between said reference strip and the front surfaces of said workpiece, a gated second thickness readout unit coupled to said slave pulse-receiver for receiving said reflected signals and providing a second output voltage proportional to the distance between the front and back surfaces of said workpiece, a first adjustable gain amplifier coupled to the output of said first thickness readout unit, a second adjustable gain amplifier coupled to the output of said second thickness readout unit, means for combining and amplifying the outputs of said first and second amplifiers to provide a summed output signal therefrom, a reference set point signal, means for comparing said summed signal with said set point signal, a servo valve, means for connecting the output of said comparing means to said servo valve, and means for connecting said servo valve to said hydraulic actuator, whereby the machining of said workpiece to a desired thickness is effected.

2. The device set forth in claim 1, wherein said means for connecting the output of said comparing means to said servo valve includes a three-stage frequency filter for providing proper magnitude and phase characteristics of signal applied to said servo valve.

3. The device set forth in claim 2, wherein said given distance said sensor is positioned from the front surface of said workpiece is about 1.5 inches.

4. The device set forth in claim 3, wherein said master pulser-receiver transmits electrical pulses at a maximum rate of about 10,000 pulses per second to said ultrasonic probe sensor.

5. The device set forth in claim 4, wherein said master pulser-receiver includes a wideband amplifier for receiving said reflected pulses from said probe sensor, and a series connected first video detector and amplifier and a first thickness readout amplifier connected between the output of said wideband amplifier and said first thickness readout unit, and wherein said slave pulse-receiver includes a series connected pulse amplifier, a second video detector and amplifier and a second thickness readout amplifier connected between the output of said wideband amplifier and said second thickness readout unit.

6. The device set forth in claim 5, wherein a first one-shot multivibrator is connected between said first thickness readout amplifier and said first thickness readout unit, and a second one-shot multivibrator is connected between said second thickness readout amplifier and said second thickness readout unit, said device further including a first calibration means coupled to said first thickness readout unit and a second calibration means coupled to said second thickness readout unit, said respective calibration means serving as means for adjusting the time constants of the respective readout units and for adjusting the output voltage slopes of the respective readout units to insure that these slopes are the same.

7. The device set forth in claim 6, wherein said device further includes a first video driver amplifier coupled to the output of said first video detector and amplifier, a second video driver amplifier coupled to the output of said second video detector and amplifier, a video display unit, and means for selectively coupling the outputs of said first and second video driver amplifiers to said video display unit.

* * * * *